United States Patent [19]

Cunard et al.

[11] 4,139,951
[45] Feb. 20, 1979

[54] REMOTE INDICATING COMPASS

[76] Inventors: Thomas L. Cunard, 5 Lark Terrace, R.D. No. 1, Goshen, N.Y. 10924; Ulrich O. Cunard, P.O. Box 171, No. 1 Cranberry Ct., Munster, Ontario, Canada, KOA 3PO

[21] Appl. No.: 780,502

[22] Filed: Mar. 23, 1977

[51] Int. Cl.² .............................................. G01C 17/28
[52] U.S. Cl. ..................................... 33/362; 33/363 K
[58] Field of Search ....................... 33/363 K, 362, 361

[56] References Cited

U.S. PATENT DOCUMENTS

| | | | |
|---|---|---|---|
| 2,036,444 | 4/1936 | Tolson | 33/362 X |
| 2,444,290 | 6/1948 | Granqvist | 33/362 |
| 2,620,570 | 12/1952 | Minas | 33/362 |
| 2,641,060 | 6/1953 | Sweeton | 33/362 |
| 3,387,377 | 6/1968 | Patton | 33/362 X |
| 3,888,016 | 6/1975 | Fowler | 33/363 K |
| 4,013,946 | 3/1977 | Lewis | 33/362 |

FOREIGN PATENT DOCUMENTS 2230852  2/1973  Fed. Rep. of Germany ............. 33/362

Primary Examiner—William D. Martin, Jr.

[57] ABSTRACT

Our invention relates to a novel electromechanical method and apparatus for detecting and representing the north direction and/or the heading of an object or vessel in analog and/or digital representation.

8 Claims, 7 Drawing Figures

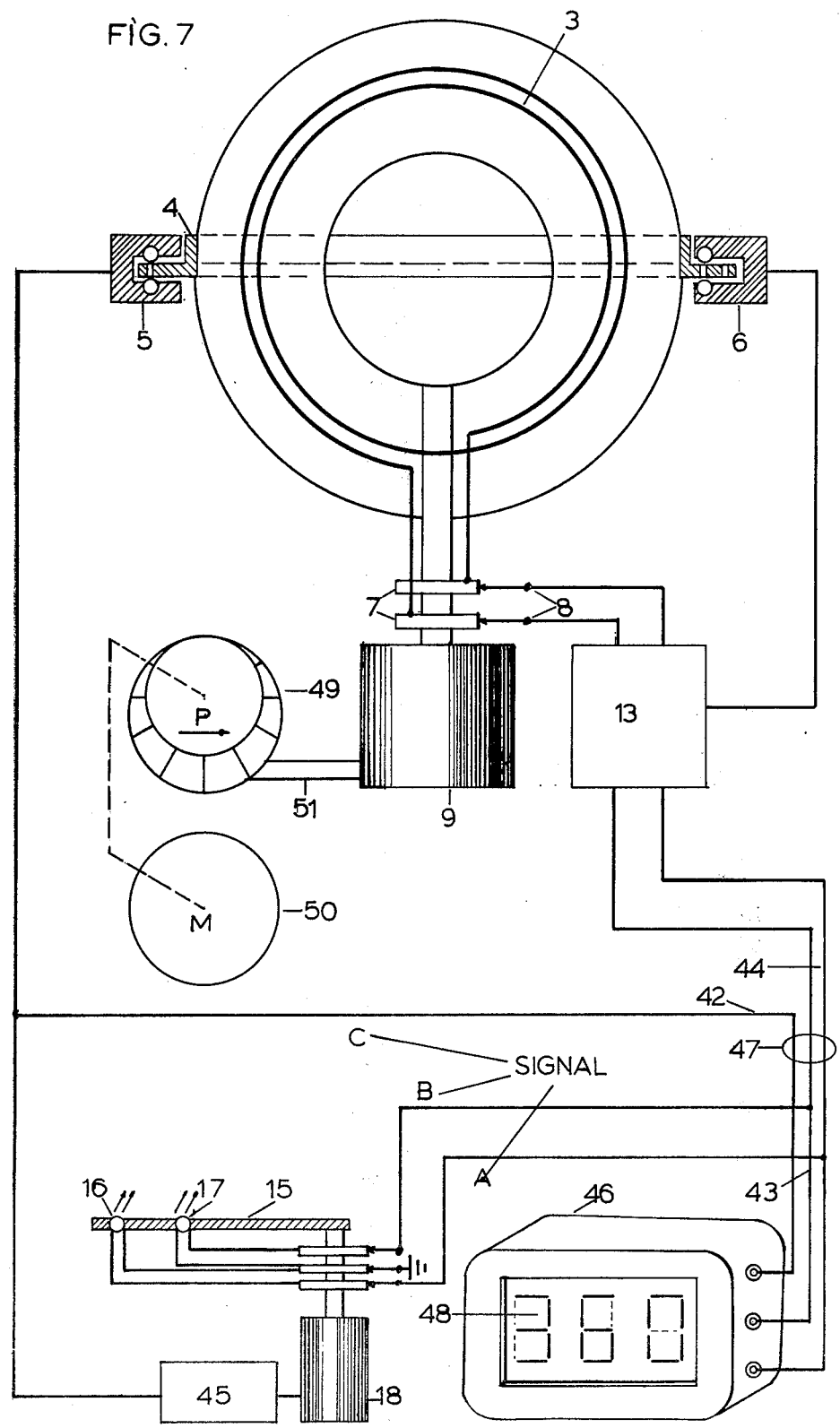

REMOTE INDICATING COMPASS

BACKGROUND OF THE INVENTION

This invention relates to a remote indicating magnetic compass. It is a particular object of our invention to derive the magnetic heading of an object or vessel by means independent of stray magnetic fields, nearby ferrous objects and the pitching, rolling and yawing of the location at which the compass is used to an extent hereinbefore unattainable in terms of convenience, accuracy and cost, for reasons including the type of sensor, its remote positioning where desired from the reading position, the electronic detection means and subsequent depiction, digitally, in numerical degrees and/or by analog means, employing points of light on the surface of a screen, cathode ray tube or other area representing the relative positions of the north direction and that of the object whose heading is required.

It is well known that the needle of a conventional magnetic compass is influenced by magnets, magnetic materials or the fields generated by electric currents in the vicinity of the conventional compass. This is especially troublesome in the case of a powerboat or aircraft when it is desirable to have the compass located on the dashboard close to other instruments which normally include strong permanent magnets such as fuel gauges, ammeters, speedometers, tachometers etc.

Further types of deviating influences to correct alignment of the conventional magnetic compass needle include the multiple irregular shocks and vibrations caused by a fast vehicle as it proceeds over a wavy surface such as the stormy sea or air, so that elaborate means of damping and suspension have to be employed, which do not eliminate, only improve inaccuracies of the readout.

Several magnetic compass systems are known which solve both the aforementioned problems, but at prohibitive cost as regards small commercial or pleasure craft. In the Sperry Gyroscope "Gyrosyn" compass, the sensor of the earth's magnetic field called the "Fluxvalve" is located in a suitable spot at the wing of an aircraft well away from the dashboard with its strong magnetic fields and is used to control a gyrowheel as a repeater in view of the pilot. Several patents have been granted for variations of the "Fluxvalve", however all are relatively expensive and elaborate for small commercial and non-commercial applications.

SUMMARY OF THE INVENTION

To the above ends, our invention consists initially of a rotating conductor or sensor. This can be a coil which due to its changing position with respect to the flux lines of the earth's magnetic field is known to exhibit a varying voltage between its terminations. The rotary coil itself is commonly described as an "Earth Inductor" and has been in use before as a means to measure the intensity and direction of the earth's magnetic field. The value of the induced voltage depends on the number of wire turns, the coil's rotational speed and the sine of the angle included between the earth's magnetic field vector and the rotational axis of the coil, so that the value of the voltage is zero when the aforementioned angle is zero. This feature has already been used in well known instruments which determine the direction of the earth's magnetic field vector by a null method.

For any position of the rotating coil or sensor, a voltage of varying magnitude will be induced whose value will always be maximum or minimum when the plane of the coil is respectively perpendicular to or parallel to the lines of force of the earth's magnetic field. The latter feature is used to advantage in our invention to eliminate errors caused by the pitching, rolling and yawing of for example a vessel proceeding over a wavy surface which irregularities would affect the position of a conventional compass needle. In our invention, it is the maxima or minima as described above which are electronically detected and used to deduce the heading, therefore eliminating the necessity of positioning the sensor as motionless as possible in space and obviating the need for elaborate balancing, stabilizing and shock absorbing devices as used with conventional devices.

In our invention, the minute voltage thus developed is transferred to an electronic apparatus by suitable pickup means such as slip rings and brushes etc. A further electric signal is provided once per revolution of the sensor to represent the axis of the location or vessel to which the sensor is fastened. This second signal is adjustable as to when it occurs with respect to the axis of the vessel or place to which the sensor is fastened by turning of the sensor housing. This second signal or pulse is transferred to the electronic apparatus by optical, point contact or other means, with the pickup device attached to the sensor housing.

Where a digital readout is required in addition to or exclusive of the analog readout, a third signal representing the absolute or incremental angular position of the sensor is transferred to the electronic apparatus. This third signal is derived from an incremental or absolute encoding device affixed to the sensor which may be of the electrical, optical or other type.

Rotation of the sensor can be accomplished by any of several driving means which will not affect its electrical characteristics, such as by wind vanes mechanically fastened to the rotating element, by an air motor, by a rigid spindle attached to a propeller immersed in the water in the case where the invention is used for example on a boat, by a properly shielded electric motor, or other means.

The three aforementioned electric signals are processed by the electronic apparatus as will be explained below, then transferred to the readout device/s which may be of the analog or digital readout type or both. The varying sensor signal is amplified as required and its reversal from an increasing to a decreasing value used to generate a pulse. This pulse represents in time the precise moment when the axis of the sensor coil is perpendicular to the flux lines of the earth's magnetic field and will be referred to below as the "A" pulse. The pulse which occurs once per revolution of the sensor coil and which represents the axis of the vessel will be referred to below as the "B" pulse. The series of pulses derived from the encoder fastened to the sensor which represents a series of positions of the sensor for each revolution of the sensor and used in conjunction with the digital readout device will be referred to below as the "C" pulses. These three signals are used to actuate the readout devices which are described in general terms as follows:

The analog readout device provides a continuous visible display of the changing position of the vehicle, vessel etc. with respect to the north direction and consists of an arm, pointer, a trace on a cathode ray tube or other contrivance rotating at the same or a multiple of the angular velocity of the rotating sensor element, to which, in the case of a mechanical arm for example, are affixed light emitting devices connected electrically between independent slip rings and a common ground slip ring.

The "A" and "B" pulses satisfactorily amplified and adjusted for pulse width as required are applied to the slip rings so that the light emitting devices will flash once per revolution of the readout device. The driving element of the analog readout device can be rotated about its axis so that the "B" pulse can be manually made to coincide with the axis of the position, vessel etc. whose heading or deviation from the north direction is to be measured. The analog readout device may also be fitted with a circular bezel calibrated in degrees of arc either movable or not, as detailed requirements will dictate. After the visible flash corresponding to the "B" pulse is made to occur at the spot on the circular path of the rotating arm for example representing the straight ahead direction or vessel axis, then the "A" pulse will be seen by a second flash of light at the exact moment when the arm points in the magnetic north direction or true north direction if corrections for magnetic declination have been made.

In this way, two flashes of light are seen on a circular path whose deviation from each other represents the heading of for example a vessel and whose changing deviations from each other represent changes in heading.

The digital readout device provides a continuous numerical value of the vessel heading and utilizes all three of the electric signals referred to above. In the case where an incremental encoder is used, attached to the rotating sensor element, the digital readout device consists essentially of an electronic counter and display containing a latch. The electronic latch is made to read the encoder pulse count when the "B" pulse occurs and the counter electronically resets to zero when the "A" pulse occurs. In this way, the counter displays the count which can be conveniently calibrated in degrees of arc and represents the heading of the vessel. In the case where an absolute encoder is used, the digital readout device consists essentially of an electronic reader coded to read the encoder code in degrees of arc at the occurrences of the "B" and "A" pulses, subtract the respective readings from one another and display the result.

Referring to accompanying drawings, a particular design of our invention is shown, embodying the main features. This particular design utilizes both an analog and a digital readout device and an incremental type encoder attached to the rotating sensor element. In this particular design, the rotating sensor element consists of a coil driven by an air motor and the analog readout device is driven at the same angular velocity by a stepping motor actuated by a signal derived from an electronic function generator actuated in turn from the "C" pulses.

DESCRIPTION OF THE DRAWINGS

FIG. 7 is a system diagram of a sensor assembly, analog readout device and digital readout device according to the invention.

DETAILED DESCRIPTION OF THE INVENTION

Figure 2:
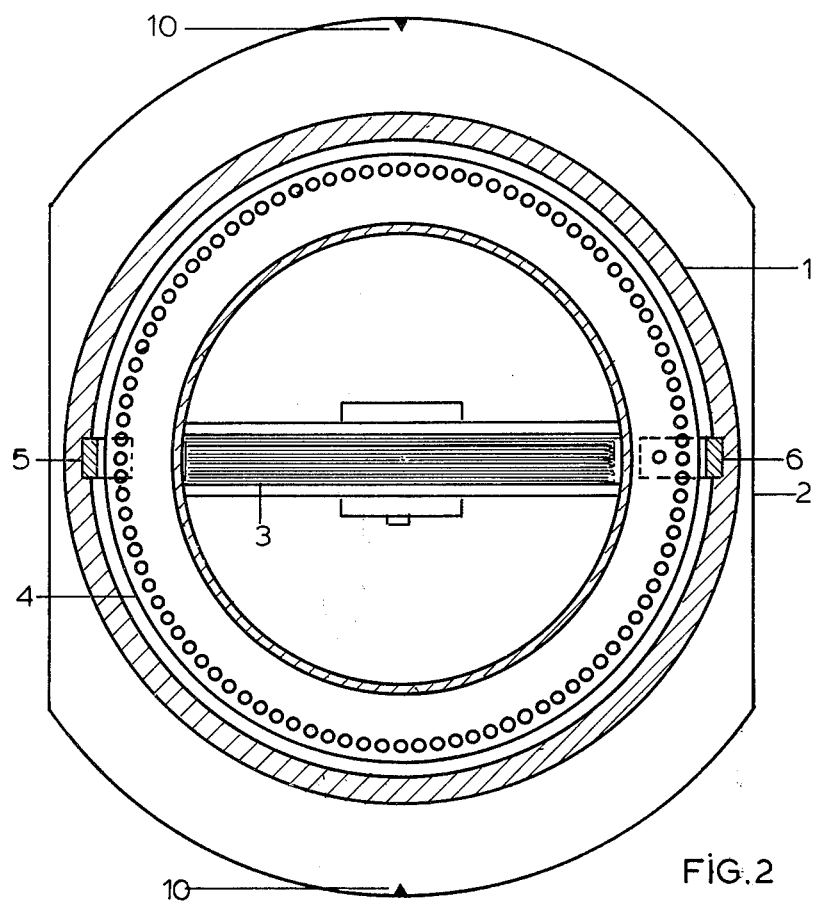
FIG. 2 is a cut-away plan view of the sensor assembly referred to in FIG. 1.
Figure 1:
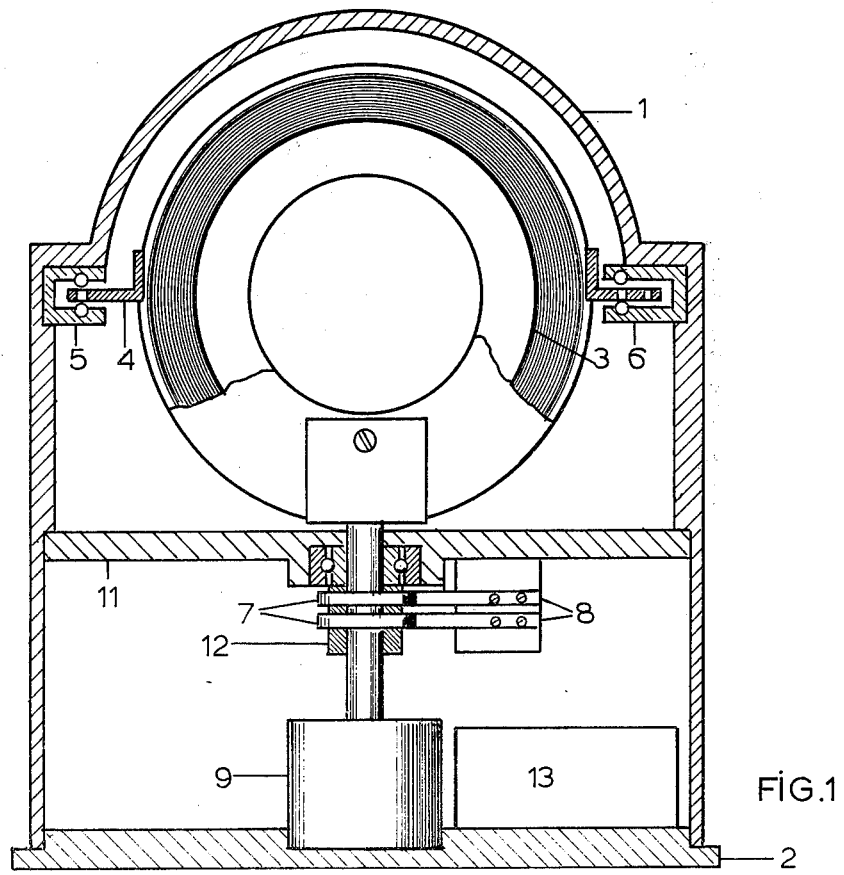
FIG. 1 is a cut-away elevation view of a sensor assembly according to the invention.
Figure 6:
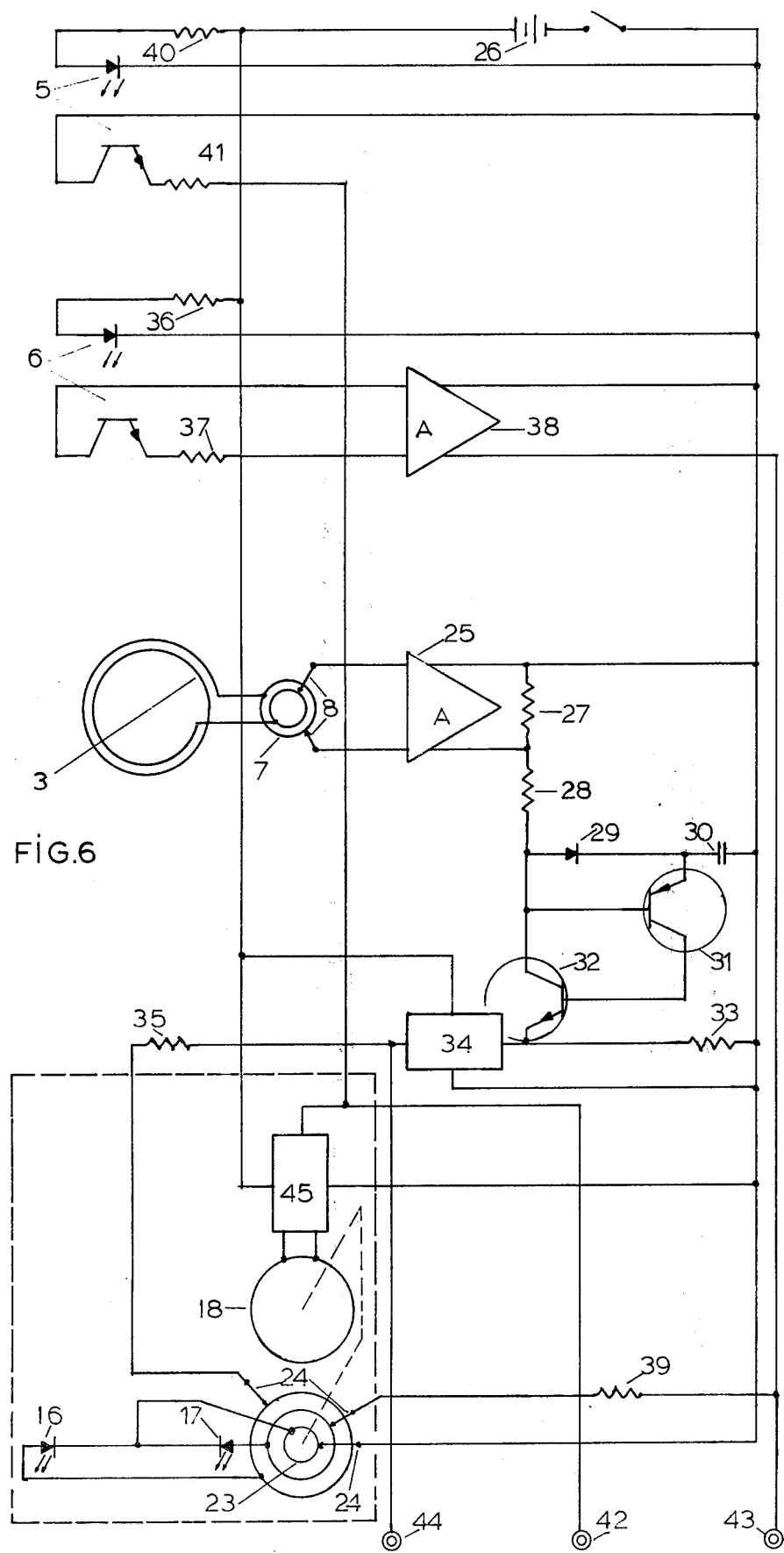
FIG. 6 is a diagram of the electrical components according to the invention.

FIGS. 1 and 2 show rotating coil 3 surrounded by protective enclosure 1 and 2. The coil rotates in a bearing supported by plate 11 and driven by air motor 9 which also supports the shaft of rotating coil 3 by virtue of its integral bearings. The coil itself consists of a former carrying the wiring which terminates in two slip rings 7 mounted on an insulating sleeve 12 and contacted by brushes 8 which conduct the minute varying "A" signal referred to previously. An encoder or counting disc 4 consisting of a round plate with holes about its periphery is attached to the coil former and monitored by two optical switches 5 and 6. Each of the items 5 and 6 comprises a commonly available optoelectronic device and contains a source of light which is a light emitting diode or LED and a light sensing phototransistor. Whenever the path of light through the device is not interrupted because the LED is aligned with a hole in the encoder disc, the phototransistor conducts. Optical switch 5 is aligned to a number of equally spaced holes on the same pitch circle of the encoder disc 4 and pulses derived from this switch comprise the "C" pulses referred to previously. A single hole on a different pitch circle of the encoder disc is aligned with optical switch 6 in such a manner that the switch is "on" when the plane of the coil 3 is at an angle of ninety degrees to the markers 10 on base 2. The markers 10 which are on a line parallel to the two straight sides of the base 2 are aligned with the axis of the place to which the sensor is affixed and in the case of a vehicle to its path when it is progressing in a straight line. They represent the course indicator of a conventional compass, or in nautical terms, the lubber line. Item 13 is the electronic apparatus which processes the "A", "B", and "C" signals, the electronic circuit of which is shown in FIG. 6 and described below. Not shown in FIGS. 1 and 2 are wires which provide a power supply for the electronic apparatus and conduct the processed signals to the analog and digital devices.

Figure 5:
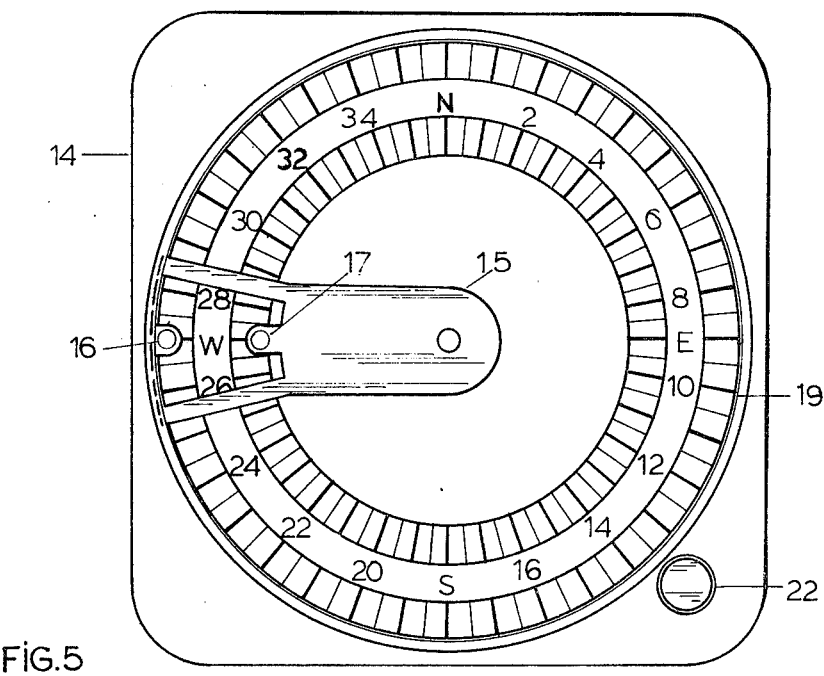
FIG. 5 is a top view of the analog readout device referred to in FIG. 3
Figure 4:
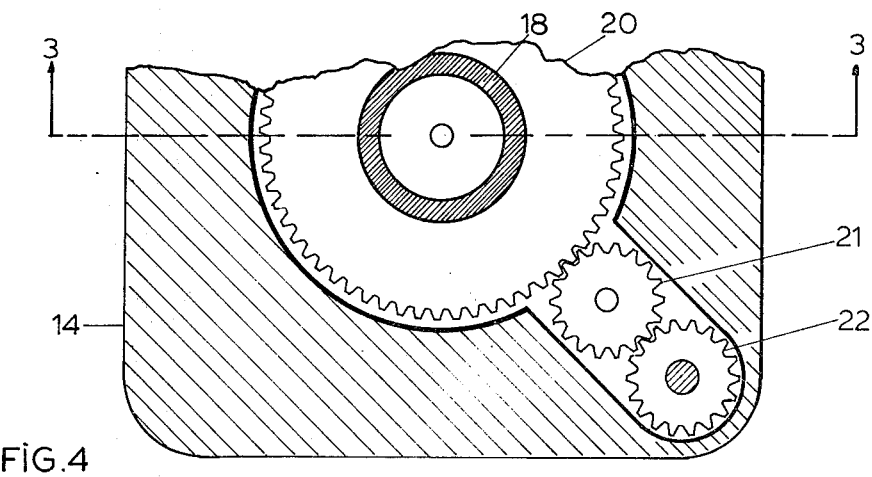
FIG. 4 is a cut-away plan view of the analog readout device referred to in FIG. 3.
Figure 3:
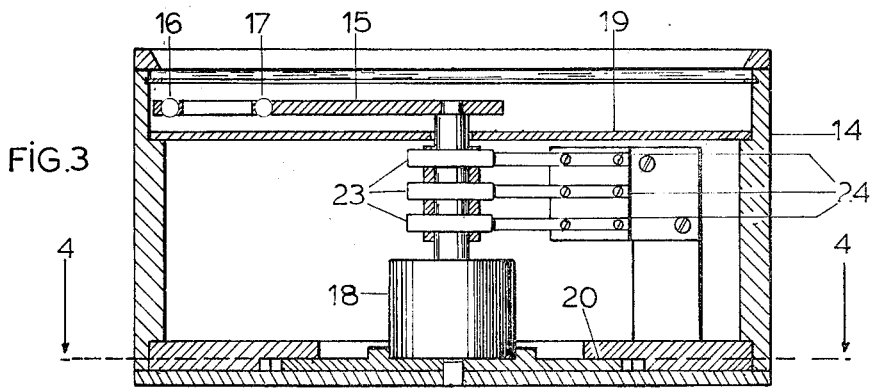
FIG. 3 is a cut-away elevation view of an analog readout device according to the invention.

FIG. 3 shows the analog readout device with instrument case 14 suitable for dashboard mounting. It contains drive motor 18 to the shaft of which are attached three slip rings 23 and an arm 15 which rotates above compass card 19 and carries two LED's 16 and 17 connected to slip rings 23 and supplied with current through brushes 24. As shown in FIG. 4, motor 18 is not directly attached to instrument case 14 but mounted to a gear wheel 20 which meshes with idler gear 21 which meshes in turn with driving pinion 22 which terminates in an adjustment knob located on the instrument face as shown in FIG. 5. By manually rotating this knob, it is possible to rotate the entire assembly of the motor 18 to any desired angular position. Such an adjustment is desirable each time the compass is switched on in order to align the flashes of light corresponding to the north direction and the vehicle axis with their desired position relative to compass card 19. While drive motor 18 will always be synchronized with the rotating sensor element as will be explained below, the relative phasing of the two devices will be indefinite on startup.

FIG. 6 shows the main components of the electronic circuitry both contained in item 13 in the sensor housing and within the analog readout device, the latter shown within the dotted border.

The minute varying voltage derived from the rotating sensor coil 3 is transmitted over slip rings 7, through brushes 8 to the input of high gain amplifier 25 which is powered by battery 26. The output of amplifier 25 is seen across load resistor 27 and fed through load matching resistor 28 into the peak detecting circuit comprising items 29 through 33. A positively increasing voltage charges capacitor 30 through diode 29. When the pulse peaks and becomes negatively increasing, a small current is injected into the base of PNP transistor 31 which switches transistor 31 on. This in turn allows a small current to be injected into the base of NPN transistor 32 switching it on also and by regenerative effect both transistors provide a low resistance path for capacitor 30 to discharge to ground potential through load resistor 33.

The circuit components are selected such that there is virtually no delay once the amplified sensor coil voltage peak occurs before capacitor 30 discharges and the occurrence of the discharge is independent of the magnitude of the sensor coil output voltage within very wide limits.

It is the latter feature that makes our invention independent of the pitching, rolling and yawing of the vessel or place to which the sensor is affixed because while such wavy conditions as referred to may reduce the sensor output voltage over a period of several rotations of the sensor coil, only the occurrence in time of the peak value is used to locate the north direction.

The voltage spike seen across resistor 33 is applied to the input of monostable multivibrator 34 which is not shown in detail for simplicity and comprises a transistor circuit of standard design or a commonly available integrated circuit component. The output of item 34 is the "A" pulse already referred to and consists of a square wave pulse, the initiation of which is exactly coincident with the start of the peak pulse already referred to. The duration of the square wave pulse is adjusted in the timing of item 34 to provide a sharp light pulse from LED 16 through brushes 24, slip rings 23 and current limiting resistor 35. A return path for LED 16 current is provided through the brush assembly to ground potential.

In this way, a sharp pinpoint of light is provided by the analog readout assembly each time the sensor coil voltage peaks as the plane of the sensor coil rotates into a position perpendicular to the lines of force of the earth's magnetic field.

Item 6, already referred to, comprises an LED powered by battery 26 through current limiting resistor 36 and a phototransistor which switches "on" when the encoder disc hole representing vehicle axis allows light to pass from the LED to the phototransistor. The electrical signal from this "on" condition is applied to amplifier 38 through matching resistor 37 and the amplified output applied to LED 17 through current limiting resistor 39.

The latter signal is the "B" pulse already referred to and it causes LED 17 of the analog readout device to flash once per revolution of the rotating sensor coil when the plane of the coil is at an angle of 90 degrees to the vehicle axis.

Item 5, already referred to, comprises an LED powered by battery 26 through current limiting resistor 40 and a phototransistor which switches "on" when the series of encoder disc holes representing sensor coil angular position allows light to pass from LED to phototransistor. The resulting series of electric signals are the "C" pulses already referred to. They are applied to function generator 45 through matching resistor 41. Item 45 is not shown in detail for simplicity but comprises a transistor circuit of standard design or a commonly available integrated circuit component. It both amplifies and converts the "C" pulses from optical switch 5 into a suitable square wave signal to drive stepping motor 18 which moves the rotating analog readout assembly one step for each step or hole of the rotating encoder disc 4, keeping the analog readout assembly in synchronism with the rotating sensor coil.

Terminals at positions 42, 43, and 44 as shown in FIG. 6 provide respectively the "C", "B" and "A" pulses used to operate the digital readout device either together with or exclusive of the analog readout device.

FIG. 7 shows the schematic relationship between the various components of the particular design of our invention as herein described, including both analog and digital readout devices.

Item 46 is the digital readout device. The detailed circuitry is not shown for reasons of simplicity and comprises a three decade counter and display system of conventional design. The counter is fed by three wires 47 not including its power supply which provide the "A", "B" and 37 C" pulses from respective terminals 44, 43 and 42 of item 13 as already described. The three decade counters are connected in tandem and are fed by the "C" pulses. Each decade counter has its own storage latch, decoder/driver and visible readout components. The "C" pulse input is fed to the units counter whose output drives the tens counter whose output in turn drives the hundreds counter for the desired total of three digits. The counters continually count the "C" pulses and reset to zero when so signalled by an "A" pulse from terminal 44 which will occur when the plane of the rotating sensor coil is perpendicular to the flux lines of the earth's magnetic field as already described.

Each of the equally spaced holes around the periphery of encoder disc 4 is so spaced as to generate a "C" pulse at one degree intervals. Thus the counters count to 360 for each revolution of the rotating sensor coil, then reset to zero at the occurrence of an "A" pulse. Each counter has a storage latch component which holds the count but does not permit the count to be displayed until signalled to read the counter by the occurrence of a "B" pulse received from terminal 43. This will occur once per revolution of the rotating sensor coil when the plane of the coil is perpendicular to the markers 10 and vehicle axis as already described. The decoder/driver components decode the latch outputs into the appropriate signals used to drive visible readout components 48, shown in FIG. 7 mounted to the face of the digital readout device 46.

The digital readout device thus provides a continuous visible display of the number of "C" pulses received between the occurrence of an "A" pulse and a "B" pulse. Since each "C" pulse corresponds to one degree of angular rotation of the rotating sensor coil, it can be seen that the number displayed corresponds to the angle in degrees of arc described by the rotating sensor coil in travelling between the directions of magnetic north and vehicle axis and thus corresponds to the vessel heading. The result is furthermore continually updated with each rotation of the coil.

Item 49 consists of an air pump driven by electric motor 50 which powers air motor 9 via air tubing 51.

We claim:

1. A remote indicating magnetic compass, having as sensor a self contained housing assembly, comprising a rotating coil on a rotational shaft lying in the plane of said coil, a motor connected to said shaft, slip rings and brushes to sense the voltage induced in said coil by the earth's magnetic field vector, a first amplifying and pulse shaping electronic network connected to said brushes providing as output a first electric pulse, whenever a line lying in the electric plane of said coil makes an angle of 90° with the earth's magnetic field vector so that the induced voltage reaches an extreme value, at least one opaque disc attached perpendicularly to said shaft of rotation of said coil, said disc having a single, small light transmissive area, a first source of light and a photo sensor located in said housing in such a manner, that light reaches the photo sensor through this small light transmissive area at only a definite angular position of said rotational shaft in relation to said housing, a second amplifying and pulse shaping electronic network connected to said first photo sensor, providing as output a second electric pulse for every rotation of said coil, said pulse providing a reference signal of the housing position, a plurality of equally spaced small light transmissive areas in said opaque disc on a pitch circle of a different radius than the radius of said single small light transmissive area, a second source of light and photo sensor located in said housing in such a manner that light reaches the photo sensor whenever one of the small light transmissive areas is in line with said second source of light and photo sensor, a third amplifying and pulse shaping electronic network connected to said second photo sensor, providing as output a plurality of third pulses for every rotation of said coil, the number of said third pulses occuring between said first and second pulse providing the measurement of the angle between the direction of the earth's magnetic field vector and the direction of said housing, said measurement of said third pulses occurring between said first and velocity of said coil and means to provide a read out device to display said angle.

2. A remote indicating magnetic compass in accordance with claim 1 providing said first pulse, whenever the voltage induced in said coil reaches a positive maximum value.

3. A remote indicating magnetic compass in accordance with claim 1 providing said first pulse, whenever the voltage induced in said coil reaches a negative maximum voltage.

4. A remote indicating magnetic compass in accordance with claim 1 having two opaque discs attached to the rotational shaft, one of said discs having the single, small light transmissive area with said first source of light and photo sensor attached to said housing, with said second amplifying and pulse shaping electronic network connected to said first photo sensor, providing as output the said second electric pulse, the second of said discs having said plurality of light transmissive areas attached to said rotational shaft, with said second source of light and photo sensor attached to said housing, with said third amplifying and pulse shaping electronic network connected to said second photo sensor, providing as output said plurality of third electric pulses.

5. A remote indicating magnetic compass in accordance with claim 1 where said read out device is an analogue device.

6. A remote indicating magnetic compass in accordance with claim 1 where said read out device is a digital device.

7. A remote indicating magnetic compass in accordance with claim 5 wherein said analogue device comprises an instrument housing, a stepping motor energized by the said third electric pulses of claim 1 a graduated dial fixed to said housing, said stepping motor rotably mounted for manual adjustment purposes, an arm attached to the shaft of said stepping motor, two sources of light such as LED's attached to said arm so as to be visible above said graduated dial, one of said sources of light connected by means of slip rings and brushes to said first pulse generated by the earth's magnetic field in accordance with claim 12, the other of said sources of light connected by means of slip rings and brushes to the second said pulse generated by the second electric pulse, generated by the small light transmissive area on the opaque disc in accordance with claim 1, the angle of rotation of said arm between the subsequent flashes of said two sources of light such as LED's indicating the direction of the earth's magnetic field vector in relation to the position of said sensor housing of claim 1.

8. A remote indicating magnetic compass in accordance with claim 6 wherein said digital device comprises an instrument housing, a three decade electronic counter with latch and reset functions and luminous numerical read out as known to the art, where said electronic counter displays in digital form on said luminous read out the number of said third pulses occurring within the angle of rotation of said coil of claim 1, between the occurrence of said first and second pulses, thus indicating the direction of the earth's magnetic field vector in relation to the position of said sensor housing of claim 1.

* * * * *